(12) United States Patent
Honna et al.

(10) Patent No.: US 12,407,659 B2
(45) Date of Patent: Sep. 2, 2025

(54) SYSTEM AND METHOD FOR GENERATING QUERIES BY MACHINE LEARNING MODELS

(71) Applicant: INFOSYS LIMITED, Bangalore (IN)

(72) Inventors: Megha Honna, Cary, NC (US); Rajeshwari Ganesan, Palo Alto, CA (US); Jasleen Singh, Bangalore (IN); Pratheeksha Maddi, Bangalore (IN)

(73) Assignee: Infosys Limited, Bangalore (IN)

(*) Notice: Subject to any disclaimer, the term of this patent is extended or adjusted under 35 U.S.C. 154(b) by 207 days.

(21) Appl. No.: 17/992,757

(22) Filed: Nov. 22, 2022

(65) Prior Publication Data
US 2024/0171554 A1  May 23, 2024

(51) Int. Cl.
G06F 16/24 (2019.01)
G06F 16/242 (2019.01)
G06N 20/00 (2019.01)
H04L 9/40 (2022.01)

(52) U.S. Cl.
CPC ...... H04L 63/0435 (2013.01); G06F 16/2425 (2019.01); G06N 20/00 (2019.01)

(58) Field of Classification Search
CPC .................................... G06F 16/2425
USPC ........................................ 707/603
See application file for complete search history.

(56) References Cited

U.S. PATENT DOCUMENTS

| | | |
|---|---|---|
| 8,931,044 B1 | 1/2015 | Subramanian |
| 10,068,099 B1 | 9/2018 | Fishbeck et al. |
| 12,086,266 B2* | 9/2024 | Yaron ............ G06F 8/71 |
| 2014/0108321 A1 | 4/2014 | Buchanan et al. |
| 2020/0286616 A1 | 9/2020 | Dunn et al. |
| 2022/0150048 A1 | 5/2022 | Parulan et al. |

(Continued)

FOREIGN PATENT DOCUMENTS

| WO | 2021138013 A1 | 7/2021 |
|---|---|---|
| WO | 2022035699 A1 | 2/2022 |

OTHER PUBLICATIONS

Kariyappa, et al: "Defending Against Model Stealing Attacks with Adaptive Misinformation"; Proceedings of the IEEE/CVF Conference on Computer Vision and Pattern Recognition (CVPR), 2020, pp. 770-778.

(Continued)

*Primary Examiner* — Baoquoc N To
(74) *Attorney, Agent, or Firm* — Finnegan, Henderson, Farabow, Garrett & Dunner LLP

(57) ABSTRACT

A method and system for generation of queries by machine learning (ML) models is provided. An ML model may generate a query based on reception of a data trigger. The query may be generated based on corresponding domain and a knowledge graph. The ML model may receive a response in an encoded format. The knowledge graph may evolve based on the response. A first subsequent query may be generated by the ML model based on the response and the evolved knowledge graph. The ML model may receive a response for the subsequent query in the encoded format. The ML model may determine whether the response culminates a current iteration. A second subsequent query may be generated by the ML model when the response does not culminate the current iteration. The current iteration may be terminated when it is determined that the response culminates the current iteration.

14 Claims, 11 Drawing Sheets

(56) References Cited

U.S. PATENT DOCUMENTS

| | | | | |
|---|---|---|---|---|
| 2023/0169170 A1* | 6/2023 | Yaron | .................. | G06F 21/577 726/1 |
| 2023/0376603 A1* | 11/2023 | Yaron | ................ | G06F 11/3664 |
| 2024/0378299 A1* | 11/2024 | Yaron | ................ | G06F 11/3672 |

OTHER PUBLICATIONS

Li, et al: "Defending against Model Stealing via Verifying Embedded External Features"; The Thirty-Sixty AAAI Conference on Artificial Intelligence (AAAI-22), published Dec. 2021.

Orekondy, et al: "Prediction Poisoning: Towards Defenses Against DNN Model Stealing Attacks", Published as a conference paper at ICLR, Apr. 2020.

Lee, et al: "Model Stealing Defense against Exploiting Information Leak through the Interpretation of Deep Neural Nets", Proceedings of the Thirty-First International Joint Conference on Artificial Intelligence (IJCAI-22), Jul. 2022.

EP Patent Application No. 22215250.6, European Search Report, dated Aug. 18, 2023.

EP Patent Application No. 22215250.6, Extended European Search Report, dated Nov. 21, 2023.

\* cited by examiner

| HAM-D Rating Scale Symptoms 802 | Pre-treatment Scores 804 | 1st Follow-up Scores 806 | 2nd Follow-up Scores 808 |
|---|---|---|---|
| | Date | Date | Date |
| 1 Depressed mood | 0 1 2 3 4 | 0 1 2 3 4 | 0 1 2 3 4 |
| 2 Guilt feelings | 0 1 2 3 4 | 0 1 2 3 4 | 0 1 2 3 4 |
| 3 Suicide | 0 1 2 3 4 | 0 1 2 3 4 | 0 1 2 3 4 |
| 4 Insomnia - early | 0 1 2 | 0 1 2 | 0 1 2 |

FIG. 8

SYSTEM AND METHOD FOR GENERATING QUERIES BY MACHINE LEARNING MODELS

FIELD

The present disclosure relates generally to data sharing, and more particularly to system and method for sharing data between data processing systems.

BACKGROUND

With the rapid advancement in a field of information and computing technology, data sharing has become crucial for promoting effective use of valuable data. Currently, to achieve organizational goals and address business difficulties, data sharing is considered as a best strategy for optimizing higher relevant data and generating more robust data as per business requirement. Since, data sharing across and within organizations is on rise, it has become an important business metric for the organizations. With an increase in data sharing, maintaining data privacy while sharing data has been an important concern.

Many existing techniques, e.g., blockchain technology hold a lot of mechanism that enables trustworthy data exchange among organizations. However, using these existing techniques, the data remains encrypted while the data is in transit and at rest, and needs to be decrypted for computation. One of an existing technique that focus on data encryption while computation includes a Fully Homomorphic Encryption (FHE) technique. The FHE technique allows computation on encrypted data without decryption. With the help of FHE technique, several instances of data breach and data related issues may be ended when an FHE layer is added to systems. However, this mechanism is effective only for enabling data sharing among single organization. For enabling data sharing among multiple organization, this technique may not be effective for sharing data among multiple organizations, the organizations are required to exchange their FHE keys for data communication, which defeats the purpose of having intra-organizational security.

Therefore, there is need to develop a system that allows exchanging of data between two or more organizations without data decryption and application of FHE keys, thereby maintain the data privacy.

SUMMARY

In one embodiment, a method of exchanging data between data processing systems is disclosed. In one example, the method may include receiving, from a second data processing system by a first data processing system, a data trigger associated with an event within the second data processing system. It should be noted that the first data processing system may employ first symmetric keys for data communication and the second data processing system may employ second symmetric keys for data communication. The first symmetric keys may be distinct from the second symmetric keys. The data trigger may be received without application of the second symmetric keys. The method may further include transmitting by the first data processing system to the second data processing system, a data snippet. It should be noted that the data snippet may be representative of a data superset within the first data processing system corresponding to the data trigger. The data snippet may be transmitted without application of the first symmetric keys.

In another embodiment, a method of generating queries by Machine Learning (ML) models is disclosed. In one example, the method may include generating a query upon receiving a data trigger associated with an event, based on a domain of the event and a dynamic knowledge graph associated with the domain. The method may further include receiving a response corresponding to the query in a pre-defined encoded format. It should be noted that, the dynamic knowledge graph may evolve based on the response. The method may further include generating a subsequent query based on the response received for the query and the evolved dynamic knowledge graph. It should be noted that the query may immediately precede the subsequent query. The method may further include receiving a response for the subsequent query in the pre-defined encoded format. The method may further include determining whether the response culminates the current iteration. The method may further include performing at least one of: generating a second subsequent query succeeding the subsequent query when the response does not culminate the current iteration and terminating the iteration when the response culminates the current iteration.

In one embodiment, a system for exchanging data between data processing systems is disclosed. In one example, the system may include a processor and a memory communicatively coupled to the processor. The memory may store processor-executable instructions, which, on execution, may cause the processor to receive from a second data processing system by a first data processing system, a data trigger associated with an event within the second data processing system. It should be noted that the first data processing system may employ first symmetric keys for data communication and the second data processing system may employ second symmetric keys for data communication. The first symmetric keys may be distinct from the second symmetric keys. The data trigger may be received without application of the second symmetric keys. The processor-executable instructions, on execution, may further cause the processor to transmit by the first data processing system to the second data processing system, a data snippet. It should be noted that, the data snippet may be representative of a data superset within the first data processing system corresponding to the data trigger. The data snippet may be transmitted without application of the first symmetric keys.

In another embodiment, a system for generating queries by Machine Learning (ML) models is disclosed. In one example, the system may include a processor and a memory communicatively coupled to the processor. The memory may store processor-executable instructions, which, on execution, may cause the processor to generate a query upon receiving a data trigger associated with an event, based on a domain of the event and a dynamic knowledge graph associated with the domain, receive a response corresponding to the query in a pre-defined encoded format. It should be noted that, the dynamic knowledge graph may evolve based on the response. The processor-executable instructions, on execution, may further cause the processor to generate a subsequent query based on the response received for the query and the evolved dynamic knowledge graph. It should be noted that the query immediately may precede the subsequent query. The processor-executable instructions, on execution, may further cause the processor to receive a response for the subsequent query in the pre-defined encoded format. The processor-executable instructions, on execution, may further cause the processor to determine whether the response culminates the current iteration. The processor-executable instructions, on execution, may further cause the processor to perform at least one of: generation of a second subsequent query succeeding the subsequent query when the response does not culminate the current iteration, and termination of the iteration when the response culminates the current iteration.

In yet another embodiment, a non-transitory computer-readable medium storing computer-executable instruction for exchanging data between data processing systems is disclosed. The stored instructions, when executed by a processor, may cause the processor to perform operations including receiving, from a second data processing system by a first data processing system, a data trigger associated with an event within the second data processing system. It should be noted that the first data processing system may employ first symmetric keys for data communication and the second data processing system may employ second symmetric keys for data communication. The first symmetric keys may be distinct from the second symmetric keys. The data trigger may be received without application of the second symmetric keys. The operations may further include transmitting by the first data processing system to the second data processing system, a data snippet. It should be noted that the data snippet may be representative of a data superset within the first data processing system corresponding to the data trigger. The data snippet may be transmitted without application of the first symmetric keys.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 8 illustrates an exemplary table including a data collected by a clinic to determine appropriate treatment for a disease of a patient, in accordance with some embodiments of the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
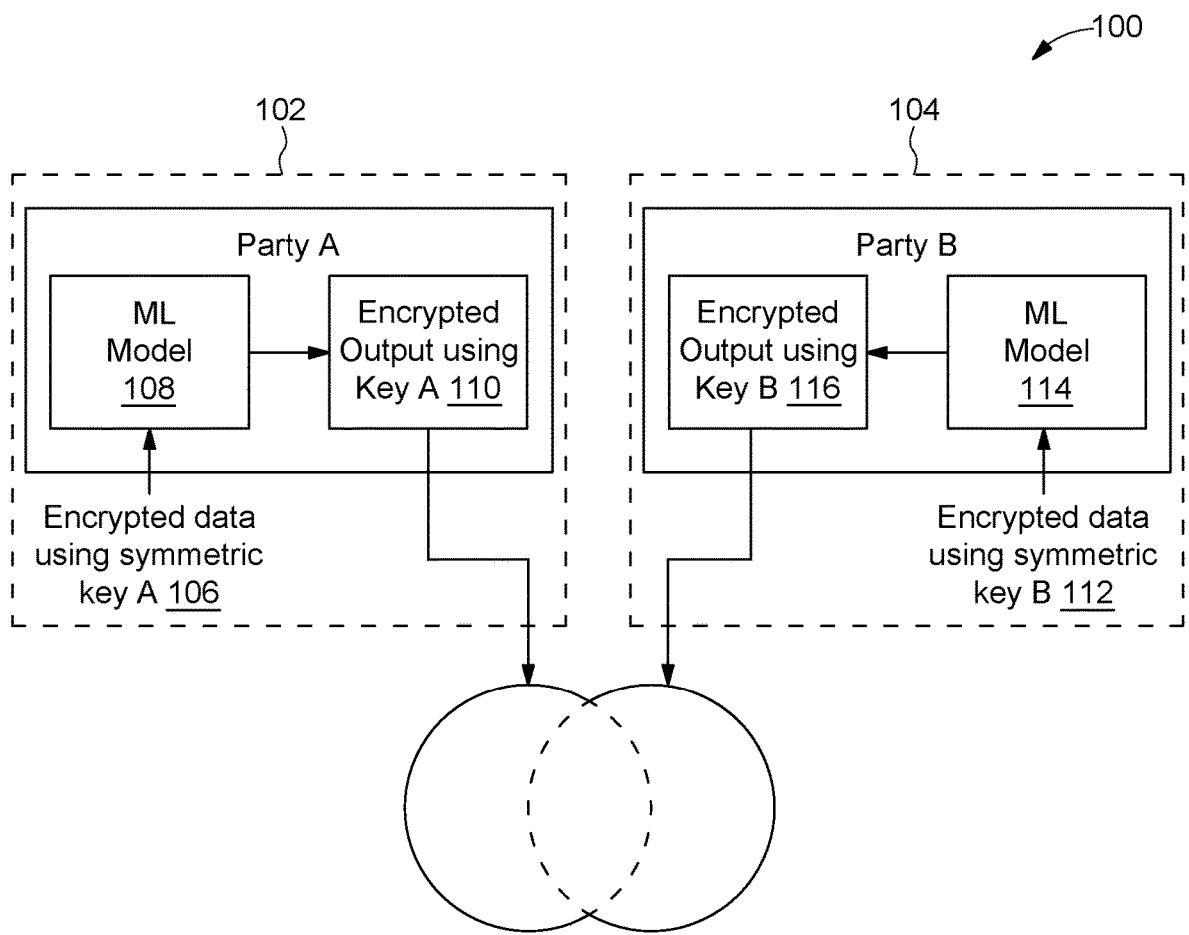
FIG. 1 illustrates an exemplary environment in which various embodiments may be employed.

An exemplary environment 100 in which various embodiments may be employed, is illustrated in FIG. 1. The environment 100 includes two data processing systems (for example, a data processing system 102, and a data processing system 104).

The data processing system 102 may correspond to a party 'A' and the data processing system 104 may correspond to a party 13'. The party 'A' may transmit encrypted data using encryption key 'A' 106 to a Machine Learning (ML) model 108. Further, the ML model 108 may perform computation on the encrypted data. As a result of computation, an encrypted output using key 'A' 110 may be generated.

On the other hand, the party 'B' may transmit encrypted data with encryption key B' 112 to an ML model 114. The ML model 114 may perform computation on the encrypted data. As a result, an encrypted output using key 'B' 116 may be generated. It should be noted that, the key 'A' or the key 'B' may be a symmetric key. Now if both processing systems, i.e., the data processing system 102, and the data processing system 104 want to exchange their data, then in this case decryption of data or key sharing may be required. However, from the perspective of data protection, the party 'A' should not share the key 'A' with party 'B' and similarly the party 'B' should not share the key 'B' with the party 'A'. In other words, to stop several instances of data breach and data privacy related issues, the party 'A' or the party 'B' must not share their respective keys, i.e., the key A and the key B during data sharing.

Further, Fully Homomorphic Encryption (FHE) is one way that allows computation on encrypted data without decryption. However, the FHE mechanism may only work in case of a single party scenario (by adding FHE layer) and is not best suited in multi-party scenarios. For example, even if both the data processing systems 102, 104 are FHE enabled system, it may not be possible to exchange the data without decryption of the data or exchanging the respective keys. Further, data sharing among both the parties i.e., the party 'A' and party 'B' without requirement of data decryption during computation may be possible with help of a data exchanging protocol which is further explained in conjunction with FIGS. 2-11.

Figure 2:
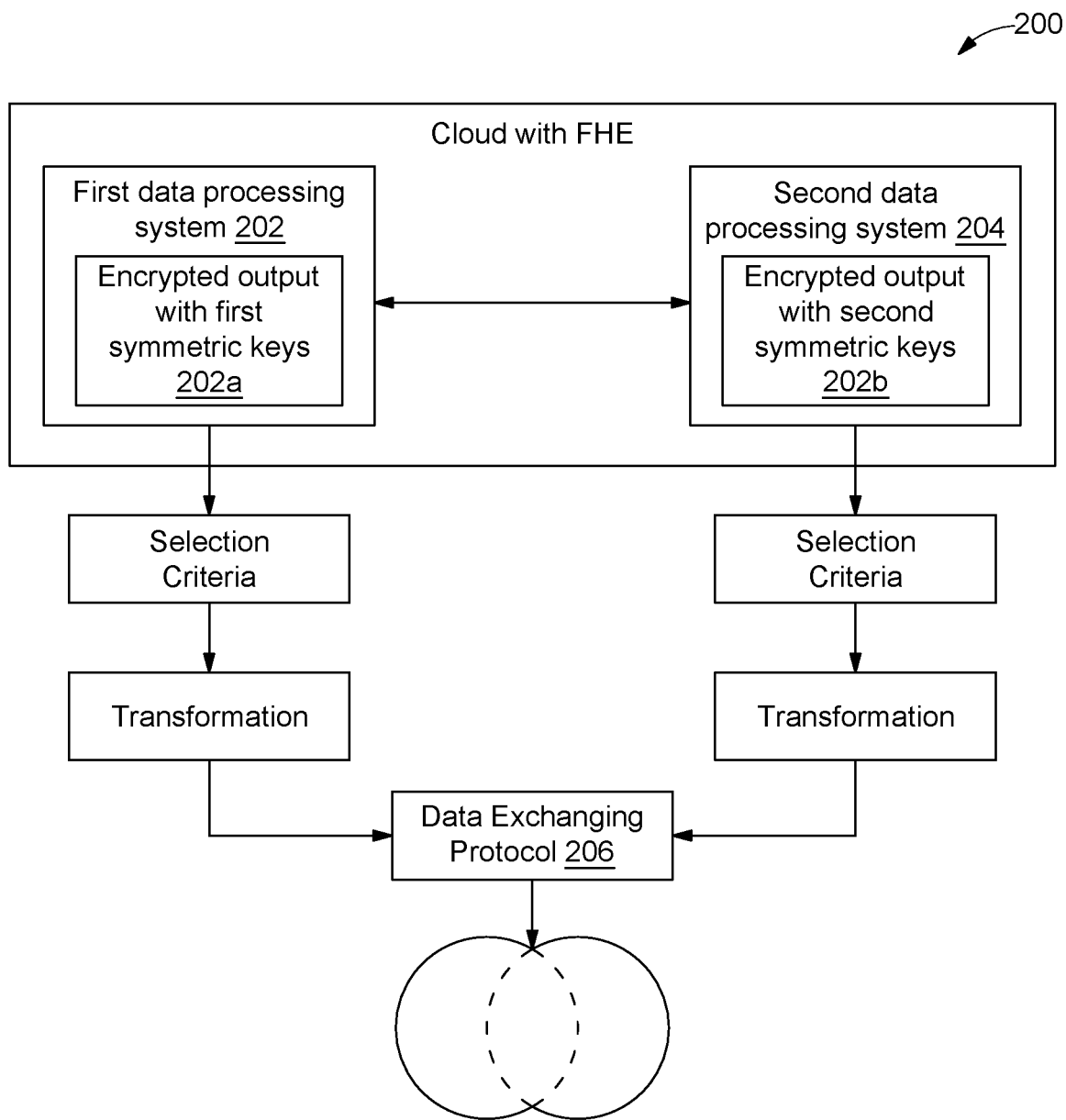
FIG. 2 is a block diagram of a system configured for exchanging data between data processing systems, accordance with some embodiments of the present disclosure.

Referring now to FIG. 2, a block diagram of a system 200 configured for exchanging data between data processing systems is illustrated, in accordance with some embodiments of the present disclosure. The system 200 includes two data processing systems (for example, a first data processing system 202, and a second data processing system 204).

In some embodiments, it should be noted that the first data processing system 202 and the second data processing system 204 are different in infrastructure and may communicate through an Application Programming Interface (API) or other kind of integration. Further, it should also be noted that both the data processing systems 202, and 204 are on a same cloud. The data processing system 202 and 204 may be similar to the data processing systems 102 and 104, respectively. In some embodiments, there may be multiple data processing systems which may want to share their data and there may be a variety of reasons for that. Moreover, both the data processing systems 202, and 204 may be FHE enabled.

The first data processing system 202 may generate an encrypted output with first symmetric keys 202a and the second data processing system 204 may generate an encrypted output with second symmetric keys 202b. Both the data processing systems 202 and 204 may exchange data through a data exchanging protocol 206.

The first data processing system 202 may be configured to receive a data trigger from the second data processing system 204. The data trigger may be associated with an event within the second data processing system 204. In an embodiment, the first data processing system 202 may receive the data trigger from the second data processing system 204 via a data exchanging protocol 206. In some embodiments, the data trigger may be a simple input. In some other embodiments, the data trigger may be a response to the query. By way of an example, the data trigger may be one of a 'Hey, I need an analysis for skin treatment', a 'Yes' response, a 'No' response, or a 'Don't know' response. The first data processing system 202 may employ the first symmetric keys 202a for data communication and the second data processing system 204 may employ the second symmetric keys 202b for data communication. It should be noted that the first symmetric keys 202a may be distinct from the second symmetric keys 202b. Moreover, the first data processing system 202 may receive the data trigger from the second data processing system 204 without application of the second symmetric keys 202b.

Further, upon receiving the data trigger, the first data processing system 202 may transmit a data snippet to the second data processing system 204 using the data exchange protocol 206. In an embodiment, the data snippet may be transmitted from the first data processing system 202 to the second data processing system 204 without application of the first symmetric keys 202a. Further, the data snippet may represent a data superset within the first data processing system 202 corresponding to the data trigger. In an embodiment, the data snippet may correspond to a domain specific query, or a pseudo query associated with the event. In addition, the data snippet may be in a predefined encoded format.

In continuation to previous example, upon receiving the data trigger, i.e., 'Hey, I need an analysis for skin treatment' from the second data processing system 204, the first data processing system 202 may be configured to transmit a data snippet, for example, 'Do you have oily skin?' to the second data processing system 204 using the data exchanging protocol 206. In current example, the event may correspond to a skin treatment. In addition, the data snippet may be transmitted by the first data processing system 202 to the second data processing system 204 without the application of the first symmetric keys 202a. Upon receiving the data snippet, i.e., 'Do you have oily skin?' from the first data processing system 202, the second data processing system 204 may be configured send to a subsequent data trigger, i.e., a response (for example: 'Yes') corresponding to the data snippet. This process of exchanging data between the first data processing system 202 and the second data processing system 204 via the data exchanging protocol 206 may continue until an output (e.g., a recommendation of a skin cream) associated with the skin treatment is obtained. In other words, both the data processing systems 202 and 204 may exchange their data without application of the first symmetric keys 202a and the second symmetric keys 202b, through the data exchanging protocol 206, thereby keeping data protection intact. In addition, the exchanging of data between the data processing systems 202 and 204 may occur based on an associated selection criteria. The selection criteria associated with the data processing system 202 and 204 may depend on parties owning the data processing system (for example: party A owning the first data processing system 202 and party B owning the second data processing system 204). By way of an example: the selection criteria for party A that owns the first data processing system 202 may be expenditure details of customers including details of customers that spend more than '50,000' INR and likely to go on a vacation. Further, the selection criteria for the party B that owns the second data processing system 204 may be vacation details of customers spending more than '50,000' INR. Based on the selection criteria associated with both the data processing system 202 and 204, the exchange of data may occur. It should be noted that, the first data processing system 202 may include an ML model. The ML model may be configured to generate the data snippet corresponding to the data trigger. The ML model may be explained further in conjunction with FIG. 3. This process of exchanging data between data processing systems is further explained in detail in reference to FIG. 3 to FIG. 10.

Figure 3:
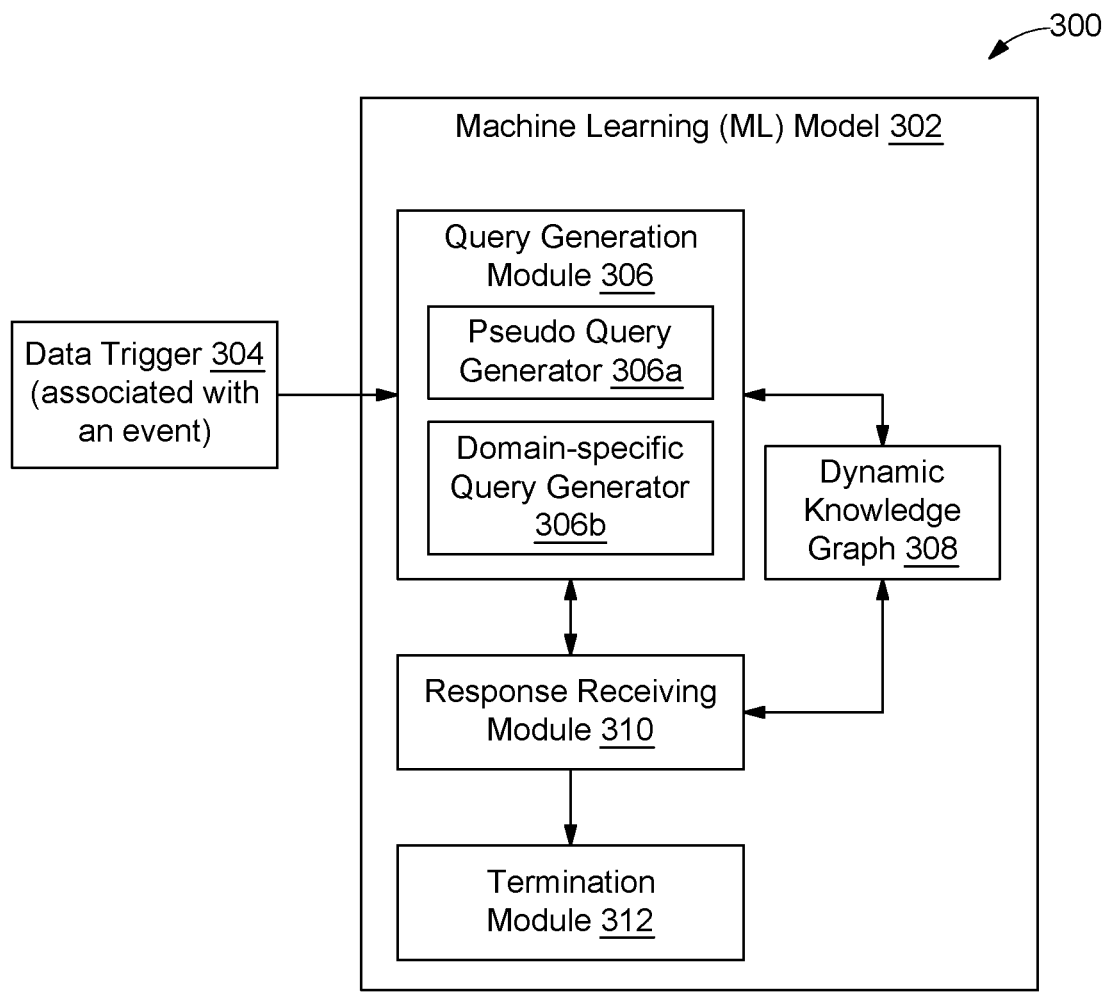
FIG. 3 illustrates a functional block diagram of various modules present within a Machine Learning (ML) model configured for generating queries, in accordance with some embodiments of the present disclosure.

Referring now to FIG. 3, a functional block diagram of various modules present within an ML model 302 configured for generating queries is illustrated, in accordance with some embodiments of the present disclosure. FIG. 3 is explained in conjunction with FIGS. 1-2. As illustrated in FIG. 3, the ML model 302 may include a query generation module 306, a dynamic knowledge graph 308, a response receiving module 310, and a termination module 312. The query generation module 306 may further include a pseudo query generator 306a and a domain-specific query generator 306b. With reference to FIG. 2, the ML model 302 may reside in a memory of the first data processing system 202. In addition, a data trigger 304 may be received by the ML model 302 of the first data processing system 202, from the second data processing system 204.

The query generation module 306 may be configured to generate queries. The queries may correspond to close ended queries. In one embodiment, the query generation module 306 may receive the data trigger 304 associated with the event. Upon receiving the data trigger 304, the query generation module 306 may generate a query corresponding to the data trigger 304. In such embodiment, the query may be generated based on a domain of the event and a dynamic knowledge graph 308 associated with the domain. It should be noted that the dynamic knowledge graph 308 may be one of a Graph Convolutional Network (GCN) and a Generative Adversarial Network (GAN). In addition, the query generation module 306 may generate a subsequent query based on a response received for the query (i.e., a previously generated query) and the dynamic knowledge graph 308. It should be noted that the query may immediately precede the subsequent query. In such embodiments, the dynamic knowledge graph 308 may be evolved based on the response to the query. The dynamic knowledge graph 308 may evolve by dynamically generating nodes within the dynamic knowledge graph 308, based on each response. By way of an example, during generation of each subsequent query, the dynamic knowledge graph 308 may be evolved based on the response received the previous query. The evolved dynamic knowledge graph may include modified paths of interconnecting nodes within the dynamic knowledge graph 308. An exemplary dynamic knowledge graph is depicted via FIG. 10. As will be appreciated, the query generation module 306 may be configured to iteratively generate subsequent queries, until the responses culminate to current iteration.

In other words, the query generation module 306 in conjunction with the dynamic knowledge graph 308 may be used to generate the queries. In one example, the queries may include the query generated upon receiving the data trigger 304, and one or more queries generated based on the responses to the previous queries. Further, to generate each query, the query generation module 306 may determine a relevancy score associated with the plurality of paths connecting a set of nodes present within the dynamic knowledge graph 308. The relevancy score for each path may be determined based on a plurality of domain specific parameters.

Further, to generate each query, the query generation module may include the pseudo query generator 306a, and the domain-specific query generator 306b. The pseudo query generator 306a may be configured to generate pseudo queries. In addition, the domain-specific query generator 306b may be configured to generate domain-specific queries (i.e., event specific queries), based on a pre-defined threshold value.

To generate a pseudo query, the pseudo query generator 306a may select a path from the plurality of paths with the relevancy score less than the pre-defined threshold value. In an embodiment, the pseudo query generator 306a may select a path from the plurality of paths based on a predefined pseudo query criteria. The predefined pseudo query criteria may include at least one of a predefined number of real queries, a predefined pattern of real queries, or a pre-defined time-interval. In an embodiment, the event specific queries may correspond to real queries. By way of an example, when the predefined pseudo query criteria correspond to the predefined number of real queries, for example: '2' real queries, then after generating '2' real queries, a third query may be generated as a pseudo query (i.e., a false query). Further, in order, to generate an event specific query (real queries), the domain-specific query generator 306b may select a path from the plurality of paths with the relevancy score greater than the pre-defined threshold value. As will be appreciated, with reference to FIG. 2, each generated query may be transmitted to the second data processing system 204 via the data exchanging protocol 206. The second data processing system 204 may be configured to provide the response corresponding to each generated query to the first data processing system 202 via the data exchanging protocol 206.

In an embodiment, several queries generated in each cycle by the query generation module 306 may differ. For example, the queries may include a first query, a subsequent query, a second subsequent query, or the like. The query generation module 306 may terminate query generation process, when sufficient information is received and there is no requirement of generating further queries. The sufficient information may be based on responses received for generated queries. In other words, the query generation module 306 may terminate process of query generation, upon determining the response culminates the iteration.

The response receiving module 310 may be configured to receive the responses corresponding to the queries. In an embodiment, the response receiving module 310 may receive the response corresponding to each query in a pre-defined encoded format. By way of an example, the pre-defined encoded format may correspond to an encoded form in which each response corresponding to each query may be received in a form of 'Yes', 'No', and 'Don't know' format. As will be appreciated, with reference to FIG. 2, each generated query may be transmitted to the second data processing system 204. The second data processing system 204 may be configured to provide the response corresponding to each query to the first data processing system 202.

The termination module 312 may be configured to determine whether the response culminates the current iteration. Based on the determination, the termination module 312 may terminate the current iteration. In other words, the termination module 312 may be configured to determine whether the sufficient information is captured to generate an output (e.g., the recommendation).

Figure 4:
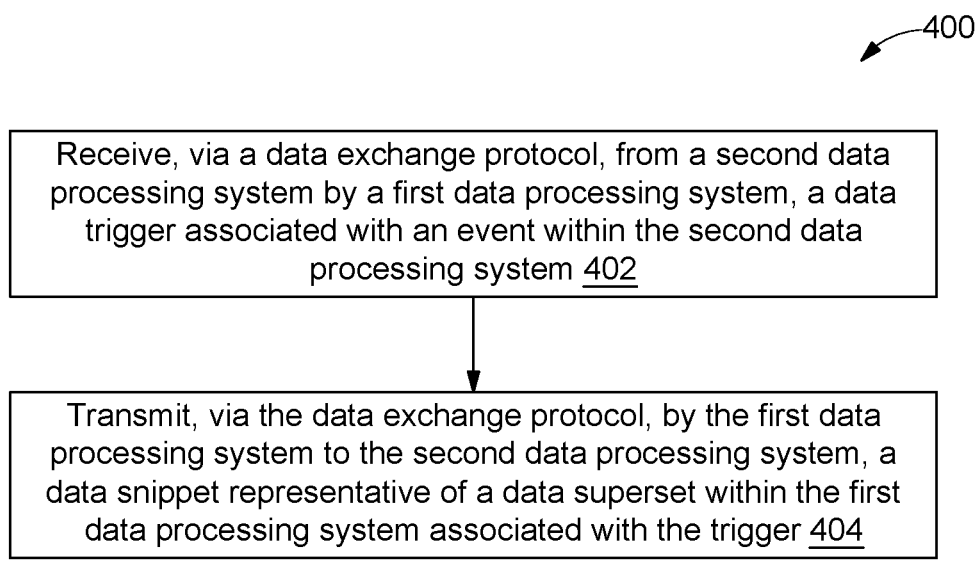
FIG. 4 is a flow diagram of an exemplary process for exchanging data between data processing systems, in accordance with some embodiments of the present disclosure.

Referring now to FIG. 4, a flow diagram of an exemplary process 400 for exchanging data between data processing systems is depicted via a flow chart, in accordance with some embodiments of the present disclosure. Each step of the process 400 may be performed by a data exchanging protocol. FIG. 4 is explained in conjunction with FIGS. 1-3.

At step 402, a data trigger associated with an event within a second data processing system may be received. The data trigger may be received by a first data processing system from a second data processing system via a data exchanging protocol. The first data processing system may employ first symmetric keys for data communication. Further, the second data processing system may employ second symmetric keys for data communication. It should be noted that the first symmetric keys may be distinct from the second symmetric keys. Additionally, the data trigger may be received without application of the second symmetric keys. With reference to FIG. 2, the first data processing system may correspond to the first data processing system 202. Further, the second data processing system may correspond to the second data processing system 204. In addition, the data exchanging protocol may correspond to the data exchanging protocol 206.

Upon receiving the data trigger, at step 404, the first data processing system may transmit a data snippet to the second data processing system. The data snippet may be representative of a data superset within the first data processing system corresponding to the data trigger. It should be noted that the data snippet may be sent without application of the first symmetric keys. In addition, the data snippet may be transmitted by the first data processing system to the second data processing system in a predefined encoded format that may not require application of symmetric keys. In an embodiment, the first data processing system and the second data processing system may be FHE enabled.

Figure 5:
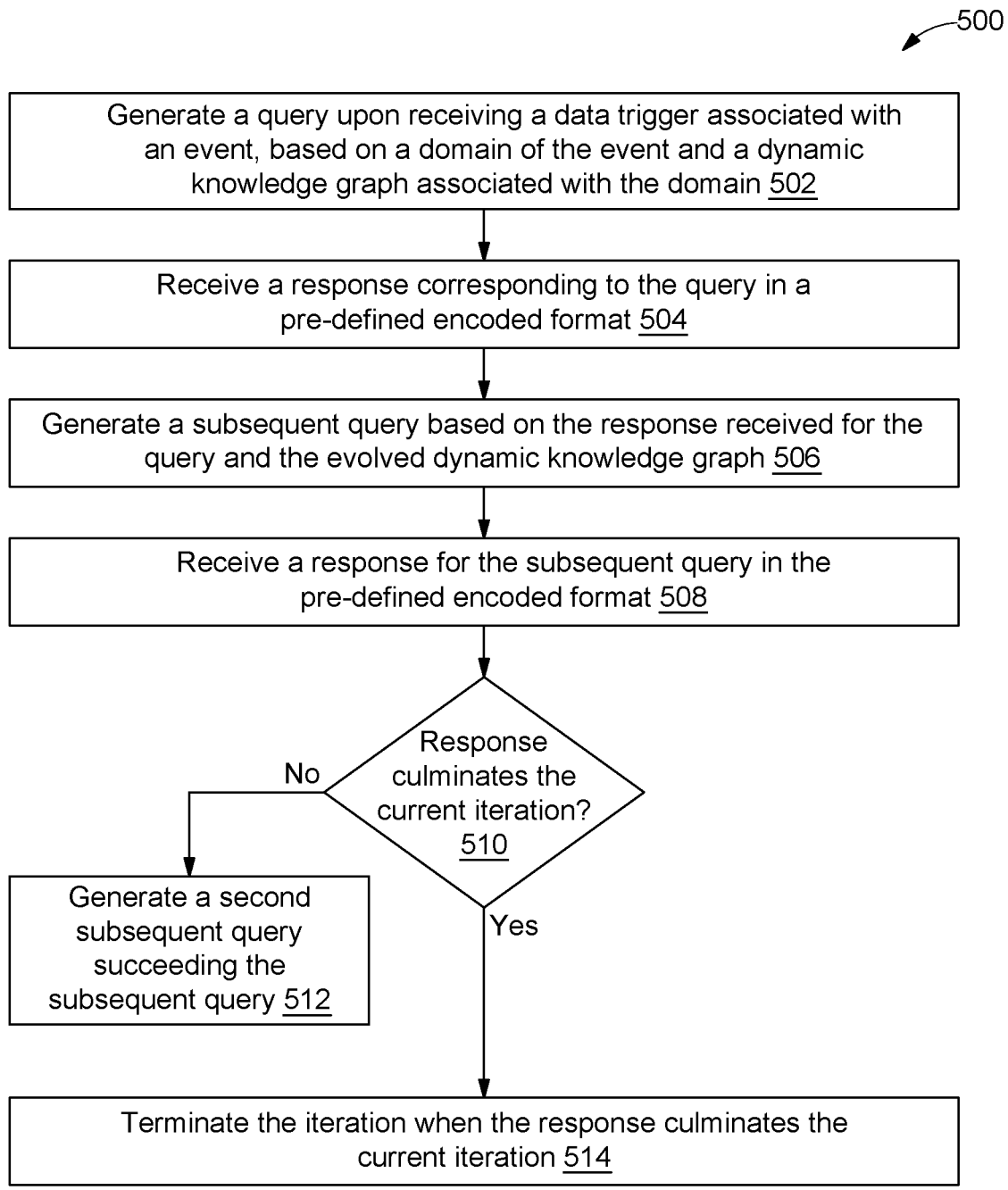
FIG. 5 is a flow diagram of an exemplary process for generating queries by ML models, in accordance with some embodiments of the present disclosure.

Referring now to FIG. 5, a flow diagram of an exemplary process 500 for generating queries by ML models is depicted via a flow chart, in accordance with some embodiments of the present disclosure. Each step of the process 500 may be performed by various modules (same as the modules 306-312) of an ML model (same as the ML model 300). FIG. 5 is explained in conjunction with FIGS. 1-4.

At step 502, a query may be generated upon receiving a data trigger associated with an event. The query may be generated based on a domain of the event and a dynamic knowledge graph (analogous to the dynamic knowledge graph 310) associated with the domain. This step may be executed by a query generation module (such as the query generation module 306). The dynamic knowledge graph may be one of a Graph Convolutional Network (GCN) and a Generative Adversarial Network (GAN).

Further, at step 504, a response corresponding to the query may be received in a pre-defined encoded format. It should be noted that the dynamic knowledge graph may evolve based on the response. This step may be executed by a response receiving module (similar to the response receiving module 310). It should be noted that, the dynamic knowledge graph may evolve by dynamically generating nodes within the dynamic knowledge graph, based on each response.

Thereafter, at step 506, a subsequent query may be generated based on the response received for the query and the evolved dynamic knowledge graph. It should be noted that the query may immediately precede the subsequent query. At step 508, a response for the subsequent query may be received in the pre-defined encoded format.

In an embodiment, each query (i.e., the query and the subsequent query) generated by the ML model may be one of an event specific query and a pseudo query By way of an example, a query generated by the ML model in first iteration may be the event specific query. Further, a query generated by the ML model in a next subsequent iteration may be the pseudo query. These queries may be generated based on the pre-defined threshold value. To generate the event specific query, the query generation module includes a domain-specific query generator (similar to the domain-specific query generator 306b). To generate the pseudo query, the query generation module includes a pseudo query generator (similar to the pseudo query generator 306a). Further, it should be noted that each query may correspond to a close ended query generated based on the evolved dynamic knowledge graph. For example, for the close ended query, responses may be received in limited ways and in encoded form. Moreover, each query may be generated by the ML model by determining a relevancy score associated with a plurality of path connecting a set of nodes present within the dynamic knowledge graph. A method of determining a relevancy score for each of the plurality of paths is further explained in detail in conjunction with FIG. 6.

Further, at step 510, a check may be performed to determine whether the response culminates the current iteration. In one embodiment, based on the check performed, at step 512, when the response does not culminate the current iteration, a second subsequent query succeeding the subsequent query may be generated. In second embodiment, at step 514, when the response culminates the current iteration, the current iteration may be terminated. The current iteration may be terminated by a termination module (such as the termination module 310).

Figure 6:
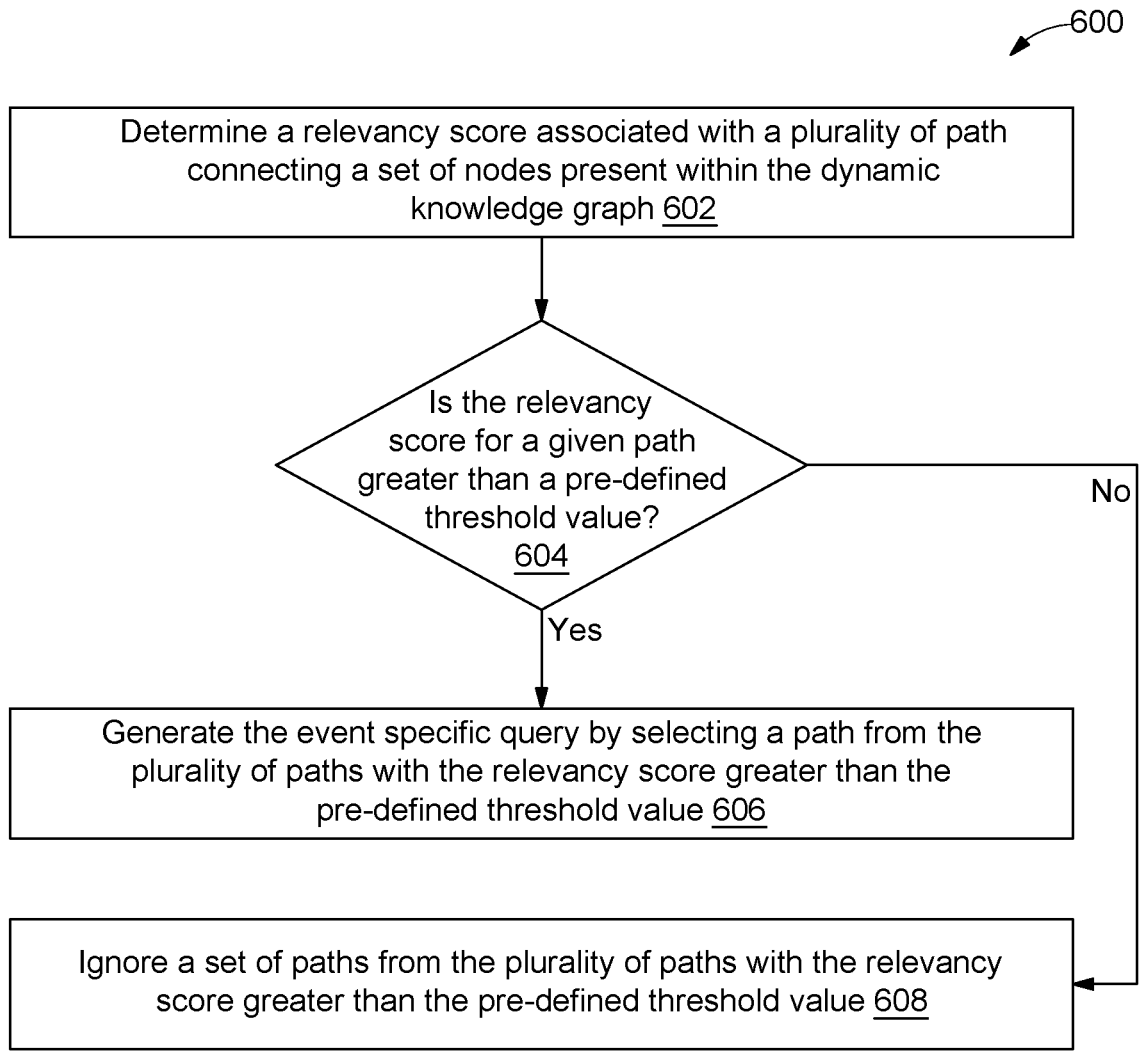
FIG. 6 is a flow diagram of an exemplary process for determining relevancy scores for generating queries, in accordance with some embodiments of the present disclosure.

Referring now to FIG. 6, a flow diagram of an exemplary process 600 for determining relevancy scores for generating queries is depicted via a flow chart, in accordance with some embodiments of the present disclosure. Each step of the process 600 may be performed by a query generation module (such as the query generation module 306). FIG. 6 is explained in conjunction with FIGS. 1-5.

To generate each query, initially, at step 602, the relevancy score for the plurality of paths may be determined to generate a query. The plurality of paths may be connecting the set of nodes within the dynamic knowledge graph. In an embodiment, the relevancy score for each of the plurality of paths may be determined based on the plurality of domain specific parameters. In one example, the plurality of domain specific parameters may be genotype, phenotype, blood group, and weight.

Once the relevancy score is determined for each of the plurality of paths, then at step 604, a check may be performed for a given path from the plurality of paths. The check may be performed for the given path to identify whether the relevancy score determined for the given path is greater than the predefined threshold value. It should be noted that, the check may be performed for each of the plurality of paths. In one embodiment, in order to generate each of the event specific query, based on the check performed, at step 606, a path from the plurality of paths with the relevancy score greater than the predefined threshold value may be selected. In another embodiment, based on the check performed, at step 608, a set of paths from the plurality of paths with the relevancy score less than the predefined threshold value may be ignored. Further, in order to generate the pseudo query, a check may be performed at start of each iteration upon receiving the response for the preceding query for the pre-defined query criteria. A method of generating pseudo queries is further explained in detail in conjunction with FIG. 7.

Figure 7:
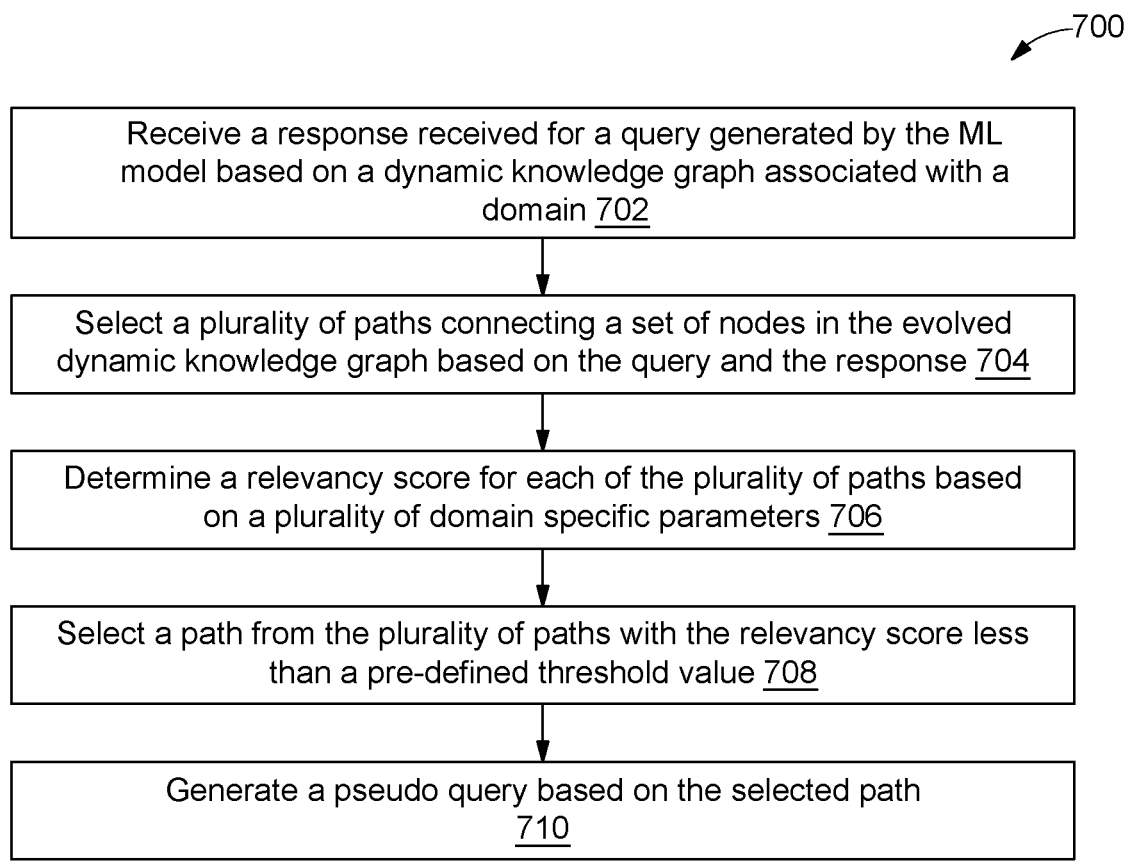
FIG. 7 is a flow diagram of an exemplary process for generating pseudo queries by ML models, in accordance with some embodiments of the present disclosure.

Referring now to FIG. 7, a flow diagram of an exemplary process 700 for generating pseudo queries by ML models is depicted via a flow chart, in accordance with some embodiments of the present disclosure. Each step of the process 700 may be performed by a pseudo query generator (such as the pseudo query generator 306a). FIG. 7 is explained in conjunction with FIGS. 1-6.

At step 702, a response corresponding to a query may be received. In an embodiment, the query may be generated by the ML model (same as the ML model 302) based on a dynamic knowledge graph (such as, the dynamic knowledge graph 310) associated with a domain. It should be noted that the dynamic knowledge graph may be evolved based on the response. In addition, the evolved dynamic knowledge graph may include modified paths interconnecting nodes within the dynamic knowledge graph. As will be appreciated, nodes of the evolved dynamic knowledge graph may be dynamically generated based on the response received for the query. An exemplary dynamic knowledge graph is depicted via FIG. 10

Upon receiving the response, at step 704, a plurality of paths may be selected. The plurality of paths may connect a set of nodes in the evolved dynamic knowledge graph. To select the plurality of paths, the query and the response corresponding to the query may be considered. Once the plurality of paths are selected, at step 706, a relevancy score for each of the plurality of paths may be determined. In an embodiment, the relevancy score may be determined based on a plurality of domain specific parameters.

Further, at step 708, based on a predefined pseudo query criteria, a path from the plurality of paths may be selected. It should be noted that the relevancy score determined for the selected path may be less than a predefined threshold value. In an embodiment, the predefined pseudo query criteria may include at least one of a predefined number of real queries, a predefined pattern of real queries, or a pre-defined time-interval. Further, at step 710, a pseudo query may be generated based on the selected path. By way of an example, when the predefined pseudo query criteria is defined to be the pre-defined time interval (for example: 2 minutes), then after every '2 minutes', the pseudo query may be generated followed with the event specific query. In other words, for a time interval of '2 minutes', the event specific query may be generated. Once the '2 minutes' are completed, a pseudo query may be generated. In order to generate the pseudo query after '2 minutes' of time interval, the path with relevancy score less than the pre-defined threshold value may be selected.

Referring now to FIG. 8, an exemplary table 800 including a data collected by a clinic to determine appropriate treatment for a disease of a patient is illustrated, in accordance with some embodiments of the present disclosure. For example, the patient comes to the clinic for the treatment of Hamilton disease and the clinic provides recommendations on drugs. As illustrated in FIG. 8, the table 800 includes Hamilton Depression (HAM-D) rating scale symptoms 802 and corresponding scores determined for a pre-treatment, a first follow up, and a second follow up.

The HAM-D rating scale symptoms 802 may include depression mood, guilt feelings, suicidal tendency, and insomnia early. For example, questions related to each of the HAM-D rating scale symptoms 802 may be asked and based on responses to the questions HAM-D scores may be determined. The patient may respond to the questions by providing a rating on a scale of '1' to '4'. Here, '1' may be the lowest rating and '4' may be the highest rating that the patient may provide. Further, the pre-treatment scores 804 corresponding to the HAM-D rating scale symptoms 802 may be scores provided by the patient before starting the treatment. Further, for example, the first follow up scores 806 may be scores provided by the patient after one week of starting the treatment. The second follow up scores 808 may be scores provided by the by the patient after two weeks of starting the treatment or after one week of providing the first follow up scores 804.

If the treatment is right for the patient or the patient gets benefit after having the drugs, then the scores may decrease subsequently as number of follow ups increases. By way of an example, for the patient, an overall HAM-D score before starting the treatment is '20' and it decreases to '17' in a result of first follow up. Further, in the result of second follow up the overall HAM-D score may decrease from '17' to '15'. This means the treatment is correct for the patient as the overall HAM-D score keeps decreasing. However, there may be some complicated cases where deciding best treatment for the patient becomes difficult as the patient may be suffering from more than one disease at a time. For example, the patient may be suffering from depression as well as diabetes and high blood pressure. In such cases, prediction of wrong recommendation of drugs to the patient may cause severe health issues. Therefore, in such cases, Artificial Intelligence (AI) or the ML models may be required for predicting drugs for the patient to provide better results.

Figure 9:
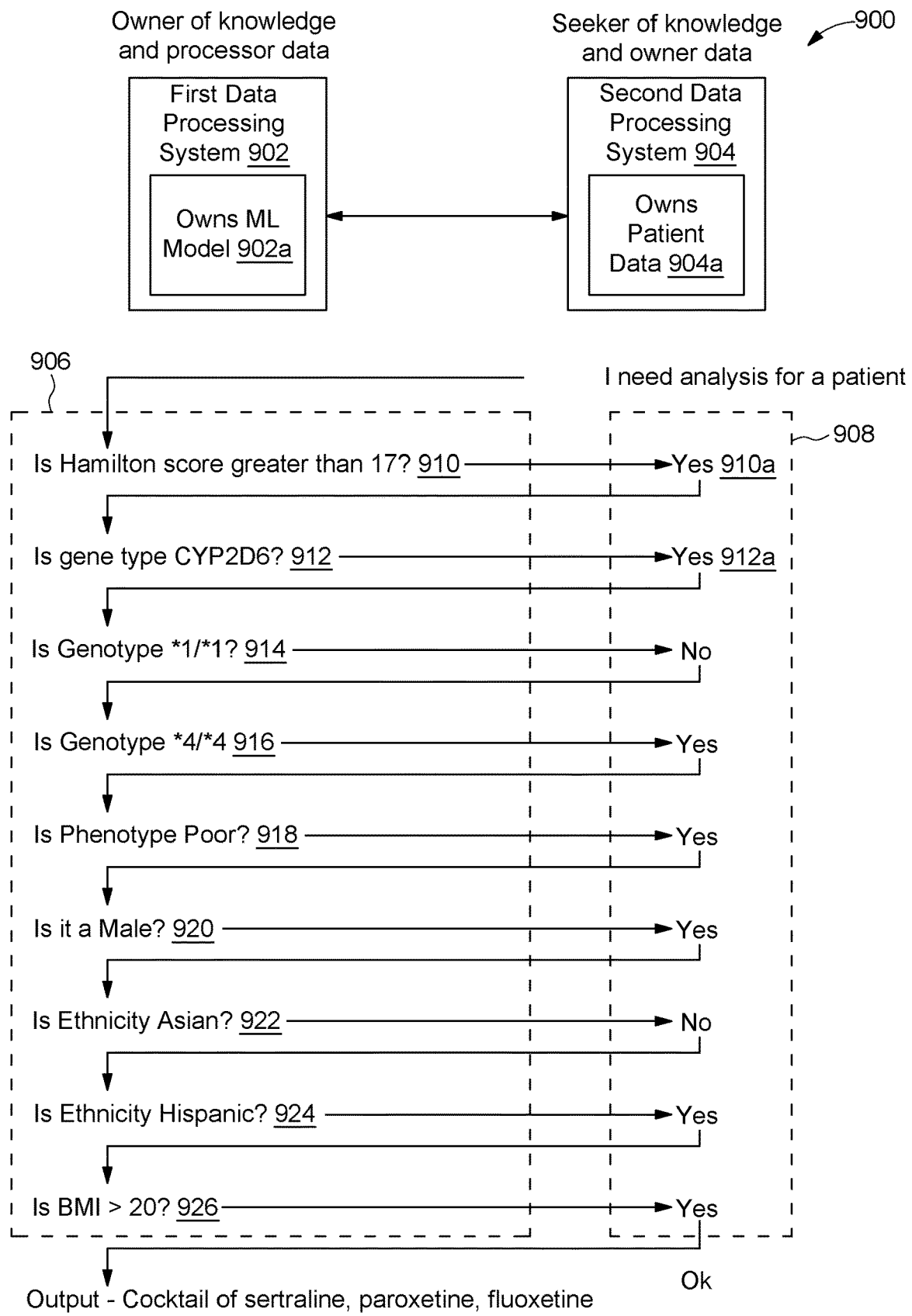
FIG. 9 illustrates an exemplary system for exchanging data between two clinics, in accordance with some embodiments of the present disclosure.

Referring now to FIG. 9, an exemplary system 900 for exchanging data between two clinics is illustrated, in accordance with some embodiments of the present disclosure. FIG. 9 is explained in conjunction with FIGS. 1-8. For example, the system 900 may include a first data processing system 902, and a second data processing system 904. The first data processing system 902 may provide a service of predicting drugs for patients. By way of an example, the first data processing system 902 may correspond to an electronic device owned by a clinic. By way of another example, the first data processing system 902 may be a telemedicine application configured for providing virtual assistance for diagnosis of a disease of a patient and prescribing drug for the diagnosed disease. As will be appreciated, the first data processing system 902 may own an ML model 902a (same as the ML model 302) configured for predicting drugs for patients. Further, a second data processing system 904 (same as the second data processing system 204) may include a patient data 904a. By way of an example, the second data processing system 904 may correspond to an electronic device owned by another clinic, or an electronic device owned by the patient. Examples of the electronic device may include, laptop, desktop, smartphone, and the like). It should be noted that, the first data processing system 902 and the second data processing system 904 may be FHE enabled systems. Further, the first data processing system 902 and the second data processing system 904 may have encrypted outputs and corresponding encryption keys. In some embodiments, the encryption keys may correspond to the symmetric keys. Since, the first data processing system 902 and the second data processing system 904 are FHE enabled systems, hence sharing of data (e.g., drugs being predicted for the patient and the patient data 904a) between the first data processing system 902 and the second data processing system 904 may require decryption of the data. However, decryption of the data may result in stealing of functionality performed by the ML model 902a for prediction of the drugs and may even compromise security of the patient data 904a. Hence, to securely share data between the first data processing system 902 and the second data processing system 904 without decrypting the data, may require usage of a data exchanging protocol (same as the data exchanging protocol 206).

Further, it may be noted that the first data processing system 902 may correspond to an owner of knowledge and processor of the patient data 904a, and the second data processing system 904 may correspond to seeker of knowledge and owner of the patient data 904a. To exchange data, initially, the first data processing system 902 may receive a data trigger from the second data processing system 904. By way of an example, the data trigger may be 'Hey, I need an analysis for a patient'. By way of another example, the data trigger may be 'What drug needs to be administrated for a diabetic patient'. In response to the data trigger, the first data processing system 902 may send a data snippet representative of a data superset. The data snippet may be a query related to the patient data 904a owned by the second data processing system 904. The query may be the close ended query that may not require application of symmetric keys. For example, the query may be 'Is Hamilton score greater than 17?'.

The ML model 902a may dynamically generate questions (queries) 906 related to the patient data 904a. The second data processing system 904 (owner of the patient data 904a) may provide responses 908 corresponding each query received from the ML model 902a of the first data processing system 902. For example, a first query generated by the ML model 902a may be 'Is Hamilton score greater than 17?' 910. The query may be generated based a domain and a dynamic knowledge graph associated with the domain (shown in FIG. 10). By way of an example, in current scenario, the domain may correspond to disease diagnosis and treatment. In response to the first query, the ML model 902a may receive a response corresponding to the first query from the second data processing system 904, in the pre-defined encoded format. For example, the pre-define encoded format may include, but is not limited to, a 'Yes' response, a 'No' response, and a 'Don't know' response, in accordance with some embodiments of the present invention. It should be noted that, in some embodiment, the second data processing system 904 may include an ML model (not shown in FIG.) configured for responding to queries received form the first data processing system 902 in the pre-defined encoded format. Further, in case when the response is 'No' for the first query, the patient may not be given any medication for the Hamilton disease as the Hamilton score is not greater than '17'.

By way of an example, consider that a response 'Yes' 910a may be received by the ML model 902a from the second data processing 904 based on the patient data 904a. It should be noted that the ML model 902a may generate queries 906 based on previous responses until sufficient information is received. By way of an example, a second query 'Is gene type CYP2D6?' 912 may be generated based on the response 'Yes' 910a received for the first query 910. It should be noted that the dynamic knowledge graph may be first evolved based on the response 'Yes' 910a, and then the second query 'Is gene type CYP2D6?' 912 may be generated. Further, a response for the second query 'Yes' 912a may be received. Similarly, other questions 914 to 926 as shown in FIG. 9 may also be generated by the ML model 902a. This way back and forth queries may be generated and corresponding responses may be received.

In each iteration, after receiving the response corresponding to each query, the check may be performed to identify whether the response culminates the current iteration. In one embodiment, when the response culminates the current iteration, then the current iteration may be terminated. In addition, when the response does not culminate the current iteration, a subsequent query may be generated. By way of an example, the ML model 902a, in the case of depression study, may not generate a question related to the Hamilton D score in the beginning, or the gender. Instead, the ML model 902a begins with the genotype where there may be many variations. Once all of the questions 906 and corresponding responses 908 are received the ML model 902a, then the ML model 902a may predict a blend of drugs (i.e., the recommendation) for the patient based on the questions 906 and the corresponding responses 908. For example, for the current scenario, the prediction may be cocktail of sertraline, paroxetine, and fluoxetine.

It should be noted that the questions 906 may include the event specific queries and the pseudo queries. The event specific queries and the pseudo queries s may be generated based on the pre-defined threshold value. Each of the event specific questions and the pseudo questions may correspond to the close ended query. This means the second data processing system 904 may respond to the questions 906 in limited ways such as 'Yes', 'NO', 'Don't Know', and sometimes with 'Probably', and 'Probably Not'. Hence, both the first data processing system 902 and the second data processing system 904 may exchange data without decryption of the data and without sharing respective symmetric keys. Further, the questions 906 are generated dynamically (as the dynamic knowledge graph evolves dynamically based on the response) and sequence of the questions 906 may never be same (i.e., a current sequence of questions may be different from historically generated sequences of questions). For example, for treating ten different patients with similar disease, the sequence of questions may always be different. Moreover, the responses 908 corresponding to the questions 906 may be always received in a predefined encoded format, irrespective to the sequence of questions. Therefore, one may not be able to replicate the functionality of the ML model 902a and compromise the patient data 904a.

Moreover, to generate each of the questions 906, the relevancy score associated with the plurality of path may be determined. The plurality of paths may be connecting the set of nodes present within the dynamic knowledge graph. In an embodiment, the relevancy score may be determined based on the plurality of domain specific parameters. With reference to present FIG. 9, the plurality of domain specific parameters may be genotype, phenotype, blood group, weight, and the like.

Further, to generate the event specific query, the ML model 902a may select a path from the plurality of paths with the relevancy score greater than the pre-defined threshold value. It should be noted that, each of the event specific query may be correspond to an indirect query, for example, instead of directly asking Body Mass Index (BMI) of the patient, which is a key information, the ML model 902a may generate the event specific question as 'Is your BMI below 20?'. By way of an example, to generate event specific query, e.g., 'Is your BMI below 20?', other parameters such as 'average height of people in India' may be considered, when the patient in an Indian born. In present FIG. 9, the event specific queries generated by the ML model 902a for exchanging data may include 'Is Hamilton score greater than 17' 910, 'Is gene type CYP2D6?' 912, 'Is Genotype*1/*1?' 914, 'Is Genotype*4/*4' 916, 'Is Phenotype Poor?' 918, and 'Is BMI greater than 20?' 926.

Further, to generate the pseudo query, the ML model 902a may perform a check for the pre-defined pseudo query criteria at each iteration, before generating each subsequent query. In an embodiment, the pre-defined pseudo query criteria may include, but is not limited to, at least one of the predefined number of real queries, the predefined pattern of real queries, and the predefined time interval. Further, based on check performed, when the pseudo query criteria for an iteration is met, then at that iteration, the ML model 902a may generate the pseudo query. In an embodiment, the pseudo query may be generated by selecting a path from the plurality of paths with the relevancy score less than the pre-defined threshold value. For example, the ML model 902a may generate queries on ethnicity 'Is ethnicity Asian?' 922, and 'Is ethnicity Hispanic' 924. However, these queries may have no correlation with the Hamilton disease, drug prediction, or psychiatry system. By way of another example, the ML model 902a may generate a pseudo query, e.g., 'Does the person have allergy?', when allergy has no correlation with final prediction (i.e., the recommendation the drug for the Hamilton disease). In the present FIG. 9, the pseudo queries generated by the ML model 902a, while exchanging data may be 'Is it a male?' 920, 'Is ethnicity Asian?' 922, 'Is ethnicity Hispanic' 924. The process of generating the pseudo queries has been already explained in conjunction with FIG. 7. Further, the pseudo queries for capturing information, i.e., ethnicity, height, and gender associated with the patient may be generated by the ML model 902a for making prediction of the functionality performed by the ML model 902a difficult by other systems, in order to avoid model stealing.

Figure 10:
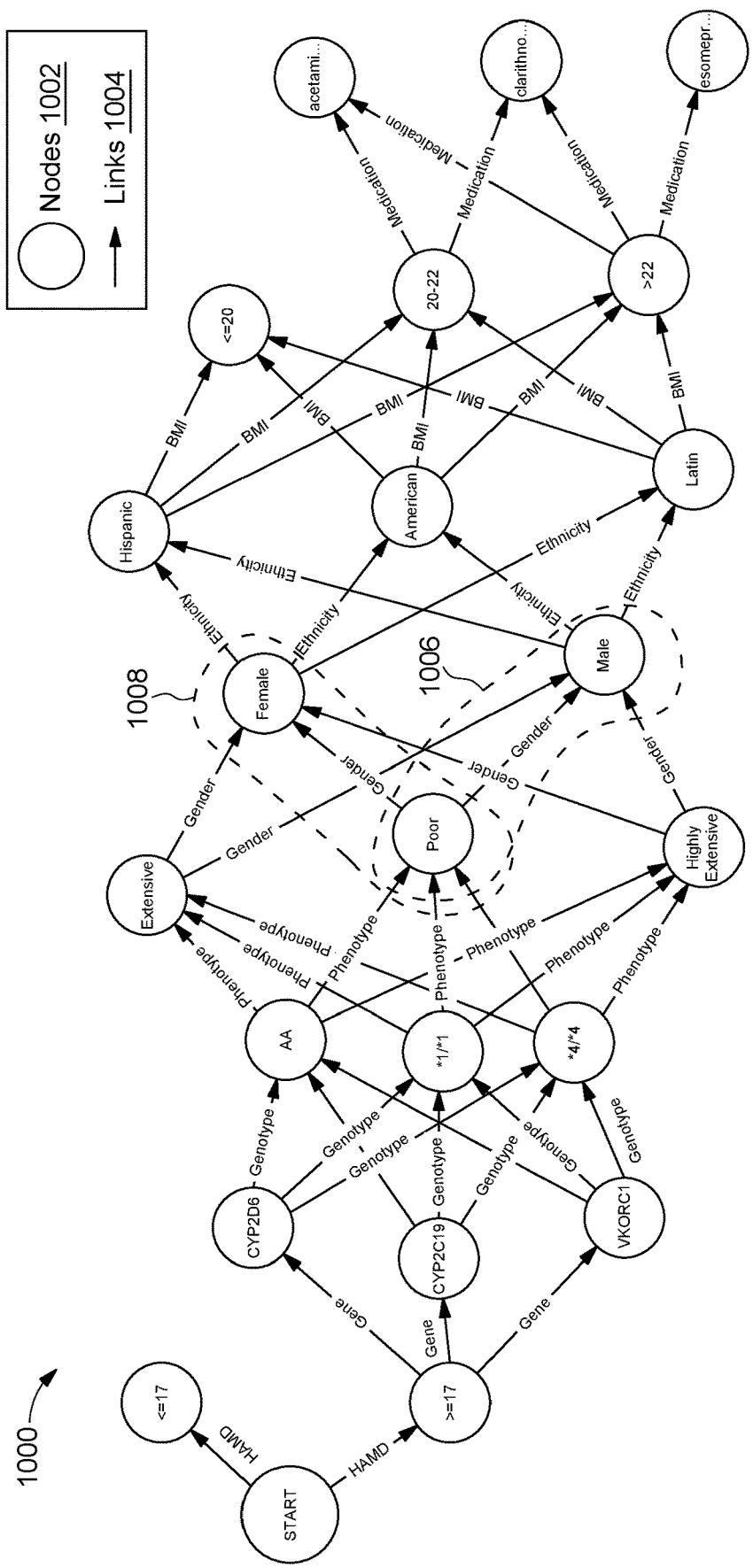
FIG. 10 illustrates an exemplary dynamic knowledge graph, in accordance with some embodiments of the present disclosure.

Referring now to FIG. 10, an exemplary dynamic knowledge graph 1000 is illustrated, in accordance with some embodiments of the present disclosure. FIG. 10 is explained in conjunction with FIG. 9. The dynamic knowledge graph 1000 is one of a Graph Convolutional Network (GCN) and a Generative Adversarial Network (GAN). The dynamic knowledge graph 1000 includes a plurality of nodes 1002 such as a node '<=17', a node 'CYP2D6', a node 'Poor', a node 'Latin', and the like. Further, the dynamic knowledge graph 1000 includes a plurality of links 1004 through which each of two nodes form the nodes 1002 are connected. Examples of the links 1004 may include a link 'Gene', a link 'Genotype', a link 'Gender', a link '>22', and the like.

The dynamic knowledge graph 1000 may be used to generate the questions 906. It should be noted that the dynamic knowledge graph 1000 may be evolved dynamically in each iteration based on the response to preceding query. The questions 906 may be generated by determining the relevancy score associated with the plurality of paths connecting the nodes 1002 present within the dynamic knowledge graph 1000. The relevancy score may be determined based on the plurality of domain specific parameters. By way of an example, based on the check performed, when predefined pseudo query criteria for the iteration is met, then in order to generate the pseudo query 'Is it a male?', a path 1006 may be selected from paths 1006 and 1008. It should be noted that, the path 1006 may be selected, upon determining the relevancy score for the path 1006 to be less than the predefined threshold value. As depicted via the present FIG. 10, the path 1006 may include the nodes 'poor' and 'Male' and the link 'Gender'. Then, based on the selected path 1006 with the interconnecting nodes 'poor' and 'male' connected with the link 'Gender', the ML model 902a may generate the pseudo query, i.e., 'Is it a male?'. In a similar manner, based on the response received for each query, the dynamic knowledge graph 1000 may be evolved by generating modified paths interconnecting nodes upon receiving the response.

Figure 11:
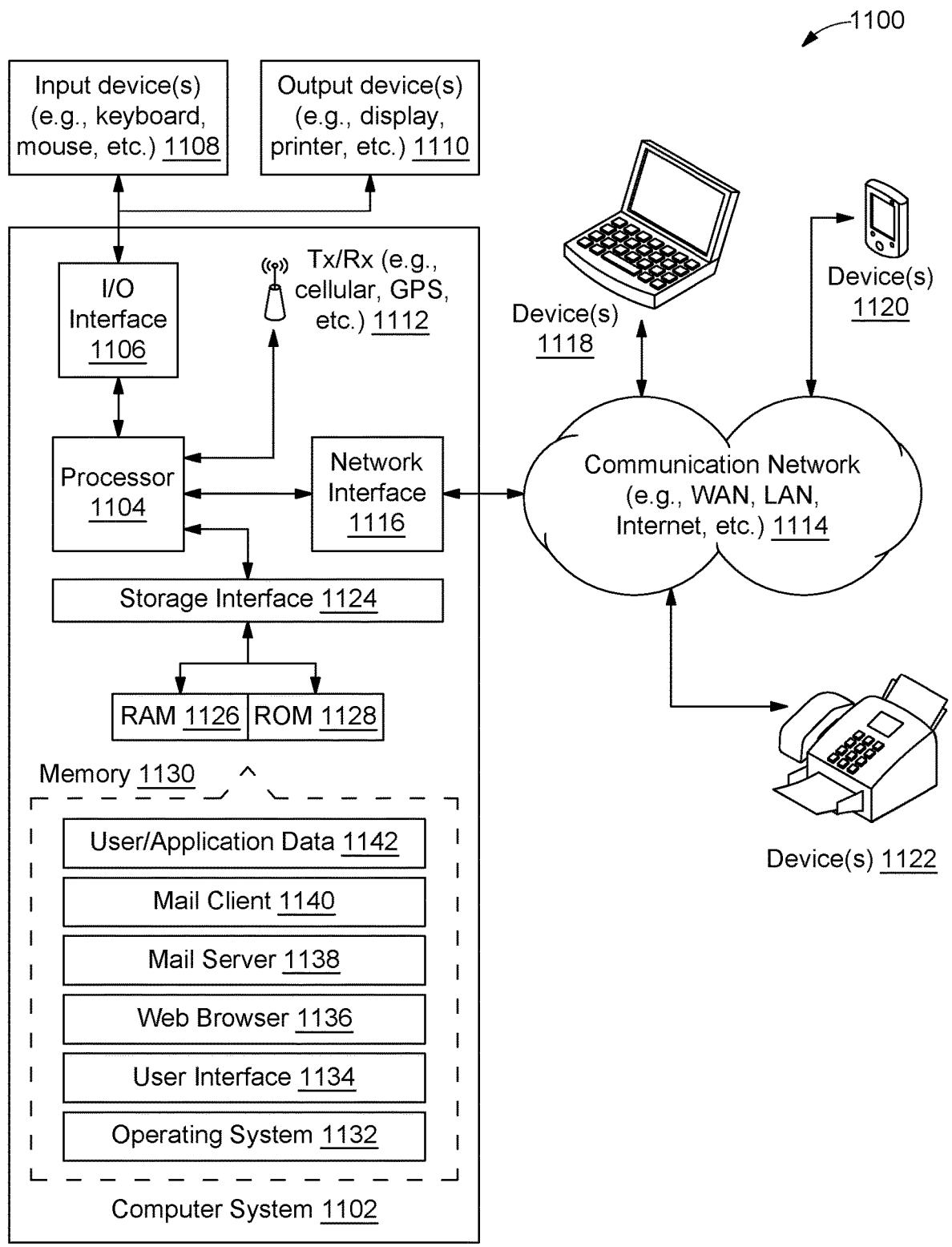
FIG. 11 illustrates a block diagram of an exemplary computer system for implementing embodiments consistent with the present disclosure.

Referring now to FIG. 11, a block diagram 1100 of an exemplary computer system 1102 for implementing various embodiments is illustrated. Computer system 1102 may include a central processing unit ('CPU' or 'processor') 1104. Processor 1104 may include at least one data processor for executing program components for executing user or system-generated requests. A user may include a person, a person using a device such as such as those included in this disclosure, or such a device itself. Processor 1104 may include specialized processing units such as integrated system (bus) controllers, memory management control units, floating point units, graphics processing units, digital signal processing units, etc. Processor 1104 may include a microprocessor, such as AMD® ATHLOM® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 1104 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1104 may be disposed in communication with one or more input/output (I/O) devices via an I/O interface 1106. I/O interface 1106 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 1002.n/b/g/n/x, Bluetooth, cellular (for example, code-division multiple access (CDMA), high-speed packet access (HSPA+), global system for mobile communications (GSM), long-term evolution (LTE), WiMAX, or the like), etc.

Using I/O interface 1106, computer system 1102 may communicate with one or more I/O devices. For example, an input device 1108 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 1110 may be a printer, fax machine, video display (for example, cathode ray tube (CRT), liquid crystal display (LCD), light-emitting diode (LED), plasma, or the like), audio speaker, etc. In some embodiments, a transceiver 1112 may be disposed in connection with processor 1104. Transceiver 1112 may facilitate various types of wireless transmission or reception. For example, transceiver 1112 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 1104 may be disposed in communication with a communication network 1114 via a network interface 1116. Network interface 1116 may communicate with communication network 1114. Network interface 1116 may employ connection protocols including, without limitation, direct connect, Ethernet (for example, twisted pair 10/100/1000 Base T), transmission control protocol/internet protocol (TCP/IP), token ring, IEEE 802.11a/b/g/n/x, etc. Communication network 1114 may include, without limitation, a direct interconnection, local area network (LAN), wide area network (WAN), wireless network (for example, using Wireless Application Protocol), the Internet, etc. Using network interface 1116 and communication network 1114, computer system 1102 may communicate with devices 1118, 1120, and 1122. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 1102 may itself embody one or more of these devices.

In some embodiments, processor 1104 may be disposed in communication with one or more memory devices (for example, RAM 1126, ROM 1128, etc.) via a storage interface 1124. Storage interface 1124 may connect to memory 1130 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 1130 may store a collection of program or database components, including, without limitation, an operating system 1132, user interface 1134, web browser 1136, mail server 1138, mail client 1140, user/application data 1142 (for example, any data variables or data records discussed in this disclosure), etc. Operating system 1132 may facilitate resource management and operation of computer system 1102. Examples of operating systems 1132 include, without limitation, APPLE® MACINTOSH® OS X platform, UNIX platform, Unix-like system distributions (for example, Berkeley Software Distribution (BSD), Free- BSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 1134 may facilitate display, execution, interaction, manipulation, or operation of program components through textual or graphical facilities. For example, user interfaces may provide computer interaction interface elements on a display system operatively connected to computer system 1102, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 1102 may implement a web browser 1136 stored program component. Web browser 1136 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 1102 may implement a mail server 1138 stored program component. Mail server 1138 may be an Internet mail server such as MICROSOFT® EXCHANGE® mail server, or the like. Mail server 1138 may utilize facilities such as ASP, ActiveX, ANSI C++/C #, MICROSOFT .NET® programming language, CGI scripts, JAVA® programming language, JAVASCRIPT® programming language, PERL® programming language, PHP® programming language, PYTHON® programming language, WebObjects, etc. Mail server 1138 may utilize communication protocols such as internet message access protocol (IMAP), messaging application programming interface (MAPI), Microsoft Exchange, post office protocol (POP), simple mail transfer protocol (SMTP), or the like. In some embodiments, computer system 1102 may implement a mail client 1140 stored program component. Mail client 1140 may be a mail viewing application, such as APPLE MAIL® mail-client, MICROSOFT ENTOURAGE® mail client, MICROSOFT OUTLOOK® mail client, MOZILLA THUNDERBIRD® mail client, etc.

In some embodiments, computer system 1102 may store user/application data 1142, such as the data, variables, records, etc. as described in this disclosure. Such databases may be implemented as fault-tolerant, relational, scalable secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

The disclosed method and the system may provide some advantages, like, the disclosed method and system may enable sharing of data between two or more parties without compromising data privacy of the parties. Further, the disclosed method and system may enable data sharing among parties even when each party FHE enabled. In addition, the disclosed method and the system may allow sharing of data between two or more ML models, data and ML model, ML model and data, data and data, without sharing respective FHE keys. Further, the disclosed method and system may help in securing ML models from stealing, as the data is exchanged between the parties in pre-defined coded format. Moreover, in order to exchange data between parties, the disclosed method and the system may randomly generate knock-off/fake questions to avoid stealing of the working of ML model by other system thus making difficult for other system to replicate the working of the ML model or data being shared among the parties.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

We claim:

1. A method for generating queries by Machine Learning (ML) models, the method comprising:
    generating, by an ML model, a query upon receiving a data trigger associated with an event, based on a domain of the event and a dynamic knowledge graph associated with the domain; and
    receiving, by the ML model, a response corresponding to the query in a pre-defined encoded format, wherein the dynamic knowledge graph evolves based on the response;

iteratively performing:
    generating, by the ML model, a subsequent query based on the response received for the query and the evolved dynamic knowledge graph, wherein the query immediately precedes the subsequent query;
    receiving, by the ML model, a response for the subsequent query in the pre-defined encoded format;
    determining, by the ML model, whether the response culminates the current iteration; and
    performing, by the ML model, one of:
        generating a second subsequent query succeeding the subsequent query, when the response does not culminate the current iteration; and
        terminating the iteration when the response culminates the current iteration.

2. The method of claim 1, wherein the dynamic knowledge graph evolves by dynamically generating nodes within the dynamic knowledge graph, based on each response.

3. The method of claim 1, wherein each query generated by the ML model is one of an event specific query and a pseudo query based on a pre-defined threshold value, and wherein each query corresponds to a close ended query generated based on the evolved dynamic knowledge graph.

4. The method of claim 3, wherein each query is generated by determining a relevancy score associated with a plurality of path connecting a set of nodes present within the dynamic knowledge graph, and wherein the relevancy score is determined based on a plurality of domain specific parameters.

5. The method of claim 3, wherein generating the event specific query comprises: selecting a path from the plurality of paths with the relevancy score greater than the pre-defined threshold value.

6. The method of claim 3, wherein generating the pseudo query comprises selecting a path from the plurality of paths with the relevancy score less than the pre-defined threshold value.

7. The method of claim 1, wherein the dynamic knowledge graph is one of a Graph Convolutional Network (GCN) and a Generative Adversarial Network (GAN).

8. A system for generating queries by Machine Learning (ML) models, the system comprising:
    a processor; and
    a memory communicatively coupled to the processor, wherein the memory stores processor-executable instructions, which, on execution, causes the processor to:
        generate a query upon receiving a data trigger associated with an event, based on a domain of the event and a dynamic knowledge graph associated with the domain; and
        receive a response corresponding to the query in a pre-defined encoded format, wherein the dynamic knowledge graph evolves based on the response;
        iteratively perform:
            generating a subsequent query based on the response received for the query and the evolved dynamic knowledge graph, wherein the query immediately precedes the subsequent query;
            receiving a response for the subsequent query in the pre-defined encoded format;
            determining whether the response culminates the current iteration; and
            performing one of:
                generating a second subsequent query succeeding the subsequent query, when the response does not culminate the current iteration; and
                terminating the iteration when the response culminates the current iteration.

9. The system of claim 8, wherein the dynamic knowledge graph evolves by dynamically generating nodes within the dynamic knowledge graph, based on each response.

10. The system of claim 8, wherein each query generated by the ML model is one of an event specific query and a pseudo query based on a pre-defined threshold value, and wherein each query corresponds to a close ended query generated based on the evolved dynamic knowledge graph.

11. The system of claim 10, wherein each query is generated by determining a relevancy score associated with a plurality of path connecting a set of nodes present within the dynamic knowledge graph, and wherein the relevancy score is determined based on a plurality of domain specific parameters.

12. The system of claim 10, wherein, to generate the event specific query, the processor-executable instructions further causes the processor to: select a path from the plurality of paths with the relevancy score greater than the pre-defined threshold value.

13. The system of claim 10, wherein, to generate the pseudo query, the processor-executable instructions further causes the processor to: select a path from the plurality of paths with the relevancy score less than the pre-defined threshold value.

14. The system of claim 8, wherein the dynamic knowledge graph is one of a Graph Convolutional Network (GCN) and a Generative Adversarial Network (GAN).

* * * * *